United States Patent [19]

Mano et al.

[11] Patent Number: 4,887,264
[45] Date of Patent: Dec. 12, 1989

[54] DIGITAL KEY TELEPHONE SYSTEM

[75] Inventors: Hiroshi Mano; Masayuki Tsurusaki; Yoshikazu Sano; Junichi Shiomi, all of Hino, Japan

[73] Assignee: Kabushiki Kaisha Toshiba, Kawasaki, Japan

[21] Appl. No.: 230,799

[22] Filed: Aug. 10, 1988

[30] Foreign Application Priority Data

Sep. 4, 1987 [JP] Japan ................................ 62-221274
Sep. 4, 1987 [JP] Japan ................................ 62-221275

[51] Int. Cl.$^4$ .......................................... H04Q 11/04
[52] U.S. Cl. .................................. 370/58.2; 370/68.1
[58] Field of Search .......................... 370/58, 85, 68.1; 379/156, 165

[56] References Cited

U.S. PATENT DOCUMENTS 4,547,877 10/1985 Lehman et al. ...................... 370/58
4,633,460 10/1986 Suzuki et al. ......................... 370/58
4,730,303 3/1988 Suzuki et al. ......................... 370/58

Primary Examiner—Douglas W. Olms
Attorney, Agent, or Firm—Foley & Lardner, Schwartz, Jeffery, Schwaab, Mack, Blumenthal & Evans

[57] ABSTRACT

In a digital key telephone system through which extension-to-extension calls can be made and incoming calls can be transferred between a master main installation and plural slave main installations, the master and slave main installations are interconnected through digital interface units provided for each installation in order to transmit and receive speech data and control data in digital code between the installations. The digital interface unit of the master main installation first designates an address of the slave main installation to which data are to be transmitted before data transmission, while the digital interface unit of the slave main installation receives data transmitted from the master main installation after address designation. Further, the addresses of the slave main installations can be designated together or separately.

10 Claims, 7 Drawing Sheets

FIG. 4(a)  DOWN BETWEEN-SYSTEM HIGHWAY

FIG. 4(b)  UP BETWEEN-SYSTEM HIGHWAY

FIG. 4(c)  BURST FORMATION (EXAMPLE)

A : ADDRESS
D : CONTROL DATA
B : SPEECH DATA
F : START BIT
A/D : ADDRESS/DATA SELECT BIT
S : STOP BIT
( ) : NUMBER OF BITS

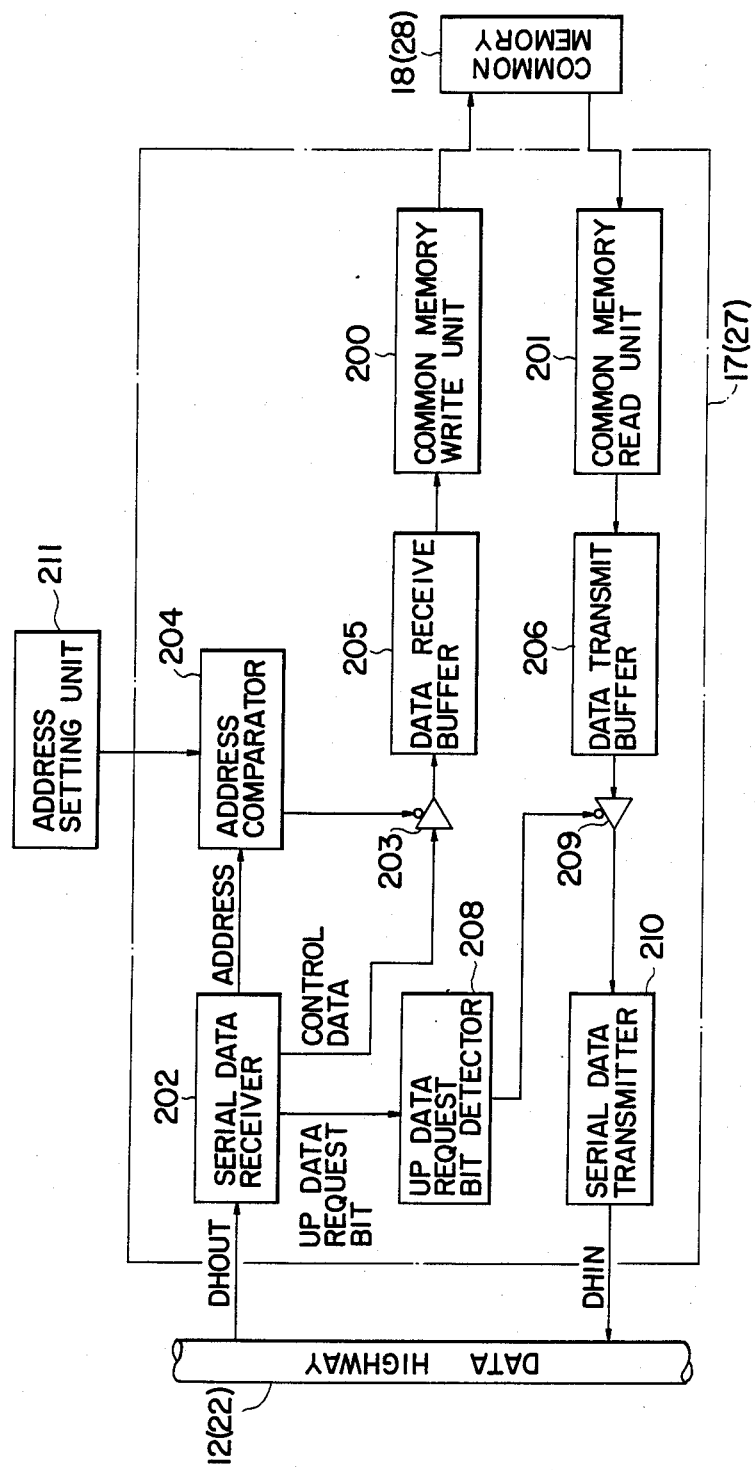
F I G. 6

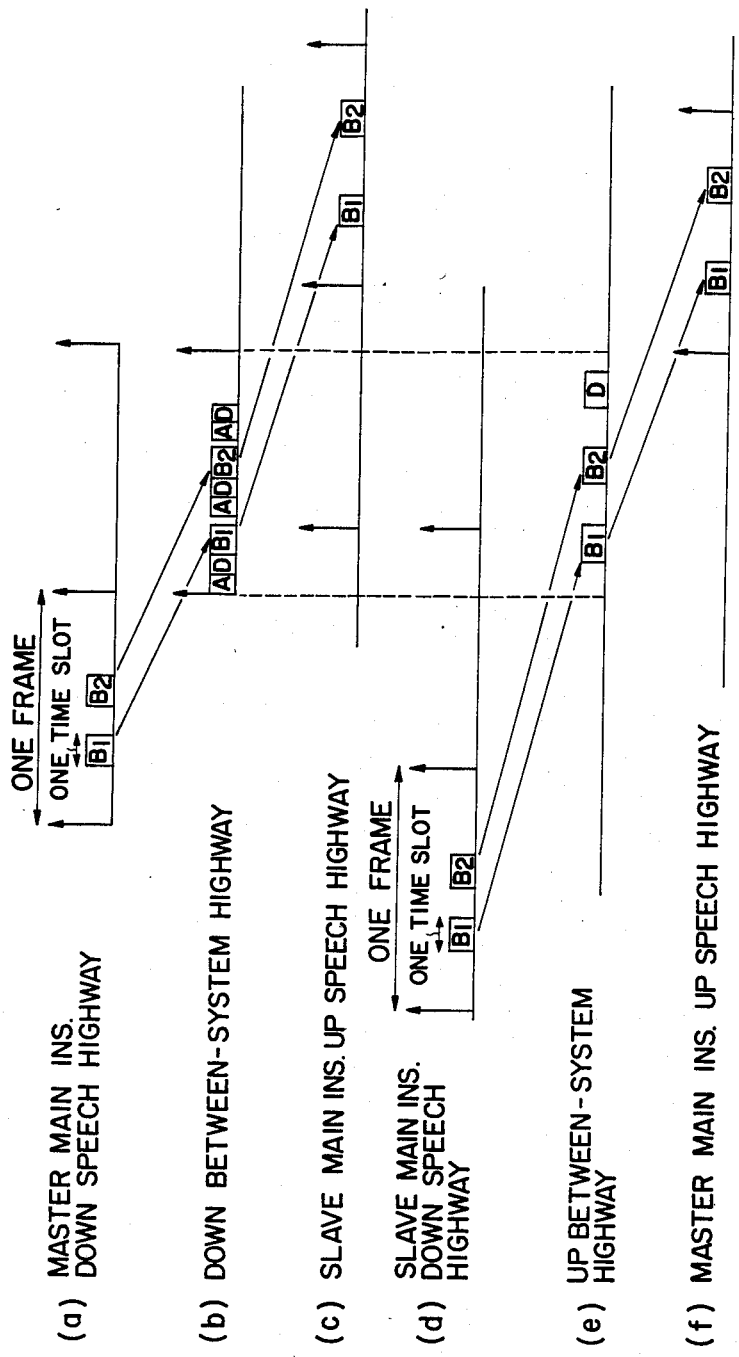

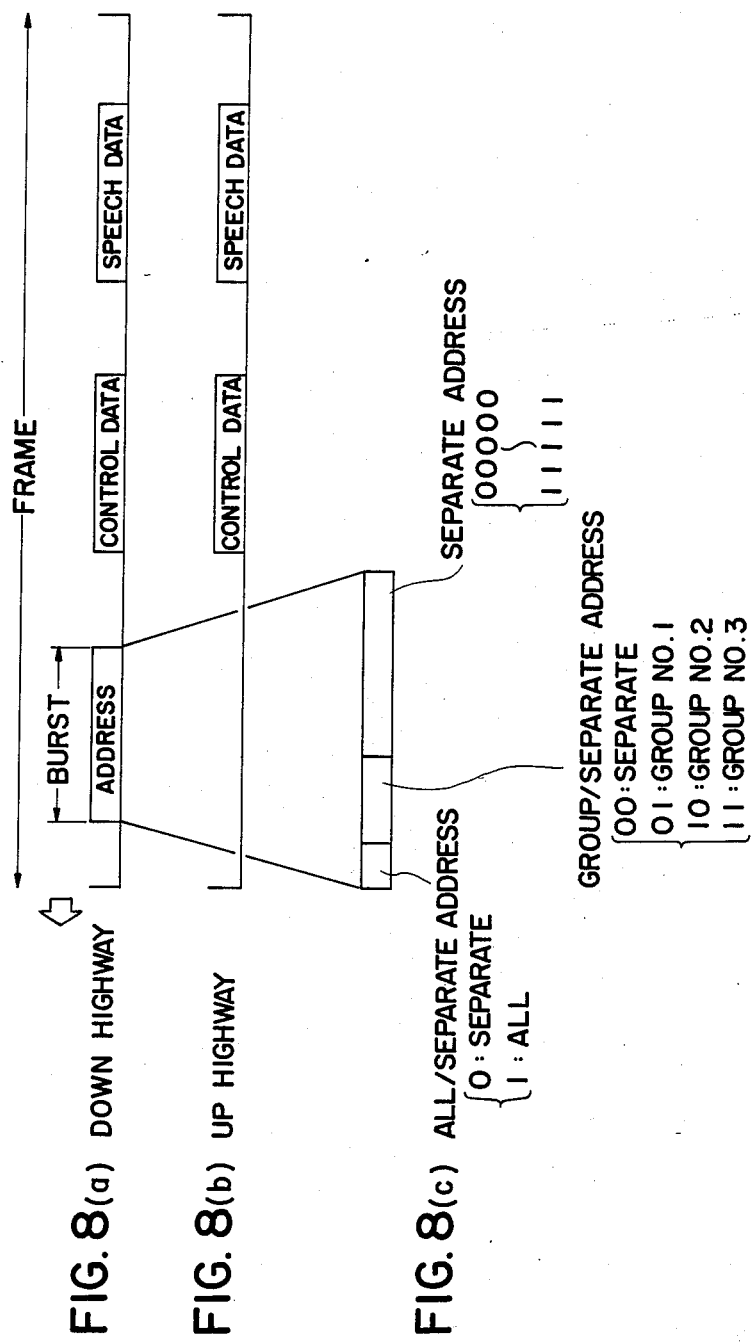

DIGITAL KEY TELEPHONE SYSTEM

BACKGROUND OF THE INVENTION

Field of the Invention

The present invention relates to a digital key telephone system (DKTS) or a simplified telephone switchboard (referred to as a digital key telephone system generically, hereinafter), and more specifically to a digital key telephone system which can increase the number of extension telephone sets by interconnecting a plurality of main installations (i.e. systems).

The method of increasing the number of extension telephone sets in a digital key telephone system can roughly be divided into two, building block and system interconnection, methods. In the building block method, a number of extension modules called extension racks are stacked on the main installation called a basic rack as building blocks in order to increase the number of extension telephone sets connectable to the main installation. In the system interconnection method, a plurality of the main installations arranged at intervals of 300 m, for instance are interconnected by some transmission lines in order to implement some simple functions such as extension-to-extension calls between two main installations (racks) or transfer of incoming calls.

The present invention relates to a digital key telephone system applicable to the latter (system interconnection) method.

The prior-art digital key telephone system applicable to the intercommunication method is generally constructed as follows: Each of plural main installations interconnected to each other is provided with an analog exchange office line interface unit to which incoming call lines are connected to transmit/receive analog signals between the main installation and the telephone exchange office and with an analog standard telephone set interface unit to which standard telephone sets (extension terminals) are connected to transmit/receive analog signals between the main installation and the standard telephone sets. For instance, when the two main installations are interconnected to each other, the analog exchange office line interface unit provided for the first main installation is connected through an analog line to the analog standard telephone set interface unit provided for the second main installation, while the analog standard telephone set interface unit provided for the first main installation is connected through another analog line to the analog exchange office line interface unit provided for the second main installation. In other words, the two main installations are interconnected crosswise to each other by two analog lines. Therefore, extension-to-extension calls or incoming call transfers are implemented between one main installation (system) and the other main installation (system) through the analog interfaces of the main installations and the analog transmission lines interconnecting the two installations.

In the prior-art digital key telephone system as described above, speech signals are converted into digital data and then transmitted or received via a channel in a time division multiplexing method between the two main installations. On the other hand, however, since the transmission line network outside the main installations and the telephone sets are of analog type, the line network and the telephone sets are connected to the main installation via an analog interface unit. Further, the two systems (main installations) are also interconnected to each other via the analog interface units. Therefore, when non-telephone terminal devices (e.g. data terminal devices) are connected to the main installation, it has been necessary to provide a MODEM (modulator-demodulator) in order to implement extension-to-extension communication of non-telephone terminal devices connected to two different systems.

In addition, since the two main installations are crosswise connected to each other as described above, there exists another problem in that the number of wires increases when the number of main installations interconnected to each other increases.

SUMMARY OF THE INVENTION

With these problems in mind, therefore, it is the primary object of the present invention to provide a digital key telephone system which can eliminate MODEMs for non-telephone terminal devices and permit a number of the main installations to be interconnected by the minimum possible number of wires.

To achieve the above-mentioned object, the digital key telephone system having a master main installation and at least two slave main installations according to the present invention is characterized in that the master main installation comprises (a) speech data exchange means for exchanging digital speech data in time division channels; (b) data transmit/receive means for transmitting and receiving speech data to and from a terminal device of the master main installation; (c) control means for controlling the speech data exchange means and the data transmit/receive means on the basis of digital control data; and (d) digital interface means for transmitting the control data and the speech data in digital code to a slave main installation whose address is designated by the master main installation; and the slave main installation comprises: (a) speech data exchange means for exchanging digital speech data in time division channels; (b) data transmit/receive means for transmitting and receiving speech data to and from a terminal device of the slave main installation; (c) control means for controlling the speech data exchange means and the data transmit/receive means on the basis of digital control data; and (d) digital interface means for receiving the control data and the speech data transmitted from the master main installation in digital code only when the address of the slave main installation is designated by the master main installation.

In the above-mentioned system configuration, since speech data and control data can be transmitted and received as digital data through the digital interface units between the master main installation and the slave main installation, intercommunication between nontelephone terminal devices connected to different systems (installations) can be made without use of any MODEM (modulator-demodulator). Further, since the master main installation first designates an address of the slave main installation to which data are to be transmitted and then transmits speech data and control data to the designated slave main installation and further since the slave main installation receives data only when its own address is designated, it is possible to connect a plurality of slave main installations to a single master main installation in a multipoint connection manner, thus reducing the number of wires required when the number of main installations interconnected increases.

The master main installation can designate addresses of the slave main installations in various ways. That is, a plurality of slave main installations can be designated simultaneously or separately. The digital interface unit of the slave main installation receives data transmitted from the master main installation only when designated simultaneously together with other installations or separately. In addition, all the slave main installations can be designated simultaneously; a plurality of previously combined slave main installations can be designated simultaneously; and each slave main installation can be designated separately. The digital interface unit of the slave main installation receives data transmitted from the master main installation only when designated simultaneously together with other installations or separately.

As described above, when a plurality of slave main installations are designated simultaneously on the basis of the addresses thereof, since the plural slave main installations thus designated can receive all the downcoming data simultaneously, it is possible to call plural slave main installations simultaneously by a single calling operation from the master main installation.

BRIEF DESCRIPTION OF THE DRAWINGS

The features and advantages of the digital key telephone system according to the present invention will be more clearly appreciated from the following description of the preferred embodiments of the invention taken in conjunction with the accompanying drawings in which:

FIG. 6 is a block diagram showing a slave-side subprocessor incorporated in an interface unit for connecting the systems in the embodiment shown in FIG. 3;

FIG. 7 is a sequence chart of data transmitted between the systems in the embodiment shown in FIG. 3; and FIGS. 8(a) to 8(c) are format diagrams of data transmitted through highways between the systems of another embodiment according to the present invention.

DETAILED DESCRIPTION OF THE PREFERRED EMBODIMENTS

To facilitate understanding of the present invention, a brief reference will be made to a prior-art digital key telephone system, with reference to the attached drawings.

Figure 1:
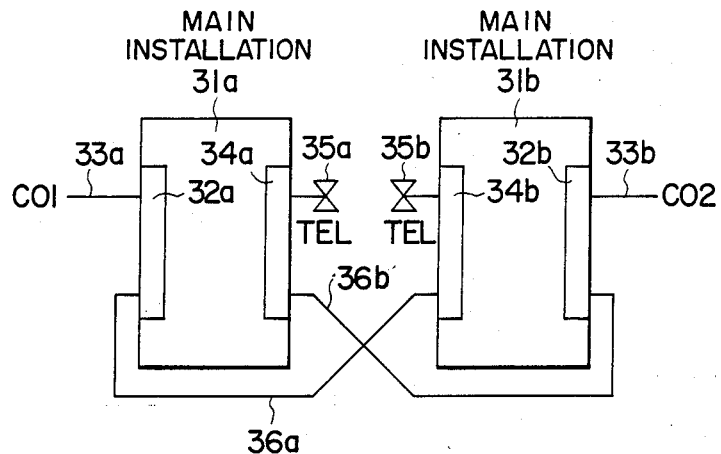
FIG. 1 is a schematic block diagram showing a prior-art digital key telephone system in which two main installations (systems) are interconnected to each other.

FIG. 1 shows an example of a prior-art apparatus in which two digital button main telephone installations (basic racks) 31a and 31b are arranged several hundred meters apart from each other, for instance. Each main telephone installation 31a or 31b is provided with an analog exchange office line interface unit 32a or 32b to which an analog incoming call line 33a or 33b is connected and with an analog standard telephone set interface unit 34a or 34b to which a single or plural standard telephone sets 35a or 35b are connected. Further, these two main installations 31a and 31b are coupled to each other by interconnecting one analog exchange office line interface unit 32a or 32b with the other analog standard telephone set interface unit 34b or 34a through an analog line 36a or 36b, respectively in a cross connection manner.

The operation of the prior-art digital key telephone system will be described simply hereinbelow by taking the case where a call incoming to the first main installation 31a through the analog incoming call line 33a is transferred to a telephone set 35b connected to the second main installation 31b. When a call comes through the incoming call line 33a, a telephone set 35a begins to ring. When a handset of the telephone set 35a is taken up, a communication channel is formed between the incoming call line 33a and the telephone set 35a, so that telephonic communication is enabled between the two. Under these conditions, when this incoming call is required to be transferred to the other main installation 31b, a specific number (e.g. "7") designating the corresponding main installation 31b is entered by pushing the hook button of the telephone set 35a rapidly the specific number times. Then, the incoming call line 33a is held temporarily, the telephone set 35a is connected to the corresponding main installation 31b via the line 36b, and a dial tone can be heard through the telephone set. Under these conditions, when an extension number of the telephone set 35b to which the incoming call is to be transferred is dialed in, a communication channel can be formed between the incoming call line 33a and the telephone set 35b to enable telephonic communication. Further, intercommunication between two extension telephone sets between the two systems can be made in accordance with the procedure which took place after the line has been held.

In the prior-art digital key telephone system as described above, speech signal is converted into digital data and then transmitted or received via a channel in a time division multiplexing method between the two main installations. However, since the line network outside the main installations and the telephone sets are of analog type, the line network and the telephone sets are connected to the main installation via an analog interface unit 32 or 34. Further, the two systems (main installations) are interconnected to each other via the same analog interface unit 32 or 34. Therefore, when non-telephone terminal devices (e.g. data terminal devices) are connected to the main installation, it is necessary to provide a MODEM (modulator-demodulator) in order to implement intercommunication between nontelephone terminal devices connected to the extension lines of the two different systems (installations).

Figure 2:
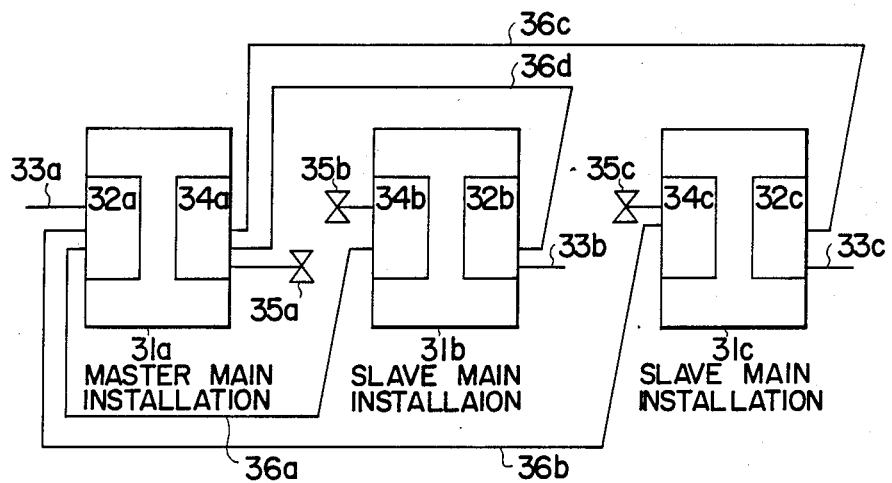
FIG. 2 is a schematic block diagram showing another prior-art digital key telephone system in which three main installations (systems) are interconnected.

In addition, since it is necessary to connect the two main installations to each other through two analog lines, there exists another problem in that the number of lines increases markedly with an increasing number of main installations. For instance, in the case of a prior-art digital key telephone system composed of three main installations as shown in FIG. 2, one master main installation 31a is connected to two slave main installations 31b and 31c, and therefore four analog lines 36a, 36b, 36c and 36d are required to interconnect the three systems.

Further, when a plurality of slave main installations are required to be called simultaneously from the master main installation to transmit the same information, since it is impossible to implement simultaneous calling; that is, since each slave main installation is called separately, there exist problems in that the processing load increases on the master main installation side and further the calling time required to call all the slave main installations becomes long.

In view of the above description, reference is now made to a preferred embodiment of the present invention, with reference to the attached drawings.

Figure 3:
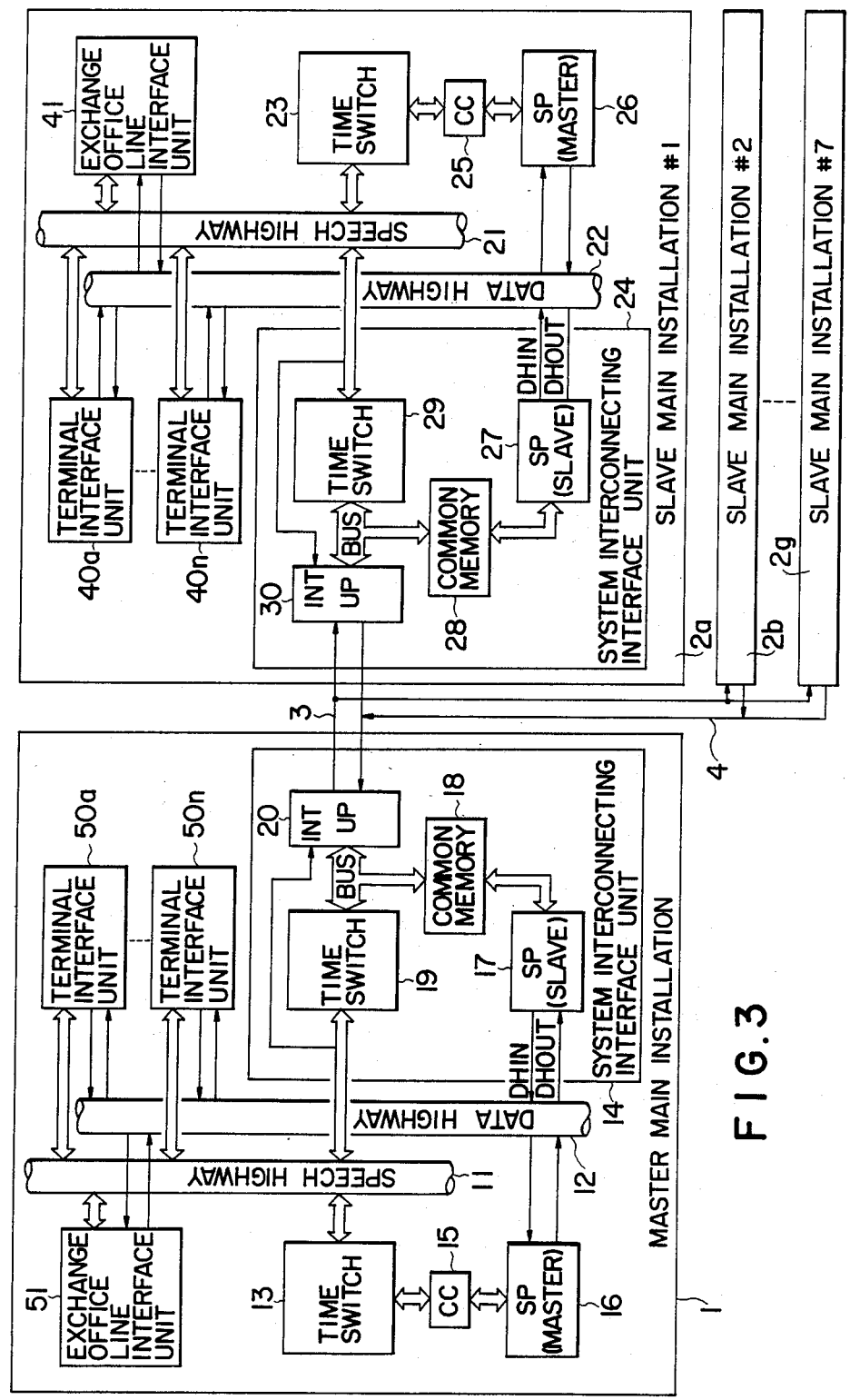
FIG. 3 is a schematic block diagram showing a preferred embodiment of a digital key telephone system according to the present invention.

In FIG. 3, a plurality of slave main installations (e.g. seven) 2a to 2g are connected to a single master main installation 1 via dual serial communication lines composed of a down between-system highway 3 and an up between-system highway 4 in a multipoint connection manner.

The master main installation 1 transmits data via the down between system highway 3 and receives data via the up between-system highway 4. On the other hand, the slave main installations 2a to 2g receive down-coming data and transmit up-going data.

Within the master main installation 1, there are provided a speech highway 11 serving as a time division channel for transmitting digital speech data (8-bit PCM code, in general); a data highway 12 for transmitting digital control data; a time switch 13 for exchanging channels on the basis of time-slot conversion of speech data on the speech highway 11; a system interconnecting interface unit 14 for transmitting/receiving digital speech data and digital control data via the between-system highways 3 and 4 between the master main installation 1 and the slave main installations 2a to 2g and also via the speech highway 11 and the data highway 12 between units in the master main installation; a central processing unit 15 for controlling units in the master main installations by transmitting/receiving digital control data thereto or therefrom; and a master-side subprocessor 16 for controlling the transmission/reception of control data to or from the central processing unit 15. Further, various terminal interface units 50a to 50n (or 40a to 40n) are provided for the main installation 1 (or 2a) to connect various terminal devices thereto; an exchange office interface unit 51 (or 41) is provided for the installation 1 (or 2a) to connect an exchange office thereto. These interface units are also connected to other units via the speech highway 11 (or 21) and the data highway 12 (or 22). As these interface units, the prior art units are usable.

Within the system interconnecting interface unit 14, there are provided a slave-side subprocessor 17 for transmitting/receiving control data to or from a master side subprocessor 16, when selected by a slave selection address supplied from the master side subprocessor 16; a common memory unit 18 for temporarily storing control data to be transmitted/received between this slave side subprocessor 17 and a microprocessor 20 (described later); and a time switch 19 for transmitting and receiving speed data (8-bit PCM codes) on time slots of the speech highway 11 designated under the control of the microprocessor 20 to or from an 8-bit data bus. The microprocessor 20 receives speech data from the time switch 19, reads control data stored in the common memory unit 18, and transmits/receives these data to or from the between-system highway serial 14 in the form of the format shown in FIG. 4. Further, a frame synchronizing signal on the speech highway 11 is inputted to an interrupt terminal INT of the microprocessor 20 in order to synchronize the timing when speech data are read from the speech highway 11 via the time switch 19 with time slot positions on the speech highway 11.

Each of the slave main installations 2a to 2g is constructed substantially in the same way as the master main installation 1, as shown in FIG. 3. However, since the format of data to be transferred between the slave systems is different from that of the master main installation as described later, a microprocessor 30 and a slave-side subprocessor 27 both provided in the system interconnecting interface unit 24 are set into a mode different from that of the microprocessor 20 and the master-side subprocessor 17, both provided in the system interconnecting interface unit 14.

Figure 4:
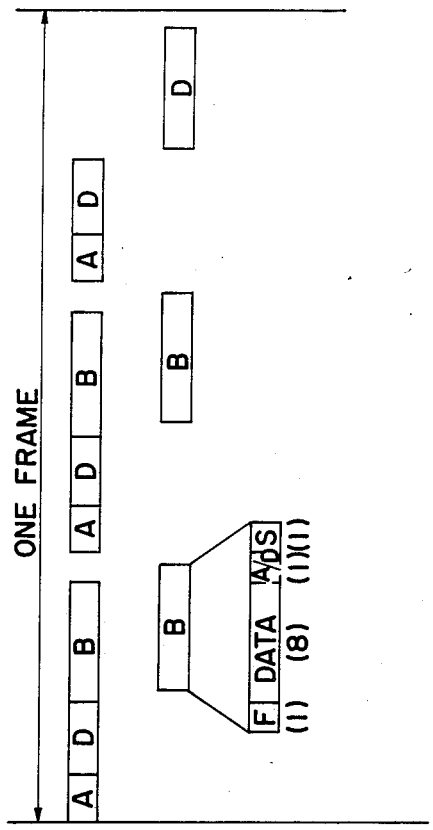
FIGS. 4 (a) to 4(c) are format diagrams of data transmitted through highways between the systems of the embodiment shown in FIG. 3.

FIG. 4 shows a format of data to be transmitted on the between-system highways 3 and 4.

The data transmit mode between the systems of the apparatus of the present invention is an all dual serial transmit mode and an asynchronizing mode in which each data (8 bits) is transmitted in a 11-bit burst unit. In this data transmit method, one frame time duration is determined to be 125 μsec so as to be equal to one frame duration during which speech data are transmitted in a time division multiplexing method within the main installation, so that it is possible to prevent no-data transmission or double data transmission. The data transmission speed is 64 Kb/s (8 KHz ×8 bits) in the case of a speech data (8 bits). Further, two channels are provided for transmitting speech data and one channel is provided for transmitting control data. In the case of down going data, however, as described later, since control data is transmitted simultaneously when an address is designated to transmit each speech data, control data are transmitted substantially through three channels.

As shown in FIG. 4(c), each burst is composed of 11 bits in total as a start bit F (1 bit), data (8 bits), an address/data select bit A/D (1 bit), and a stop bit S (1 bit). The address/data select bit A/D is a bit for discriminating whether the burst serves to transmit speech data B (referred to as a speech data burst, hereinafter) or an address A for selecting a slave main installation (referred to as an address burst, hereinafter). In the case of the speech data burst, all the 8 bits are allocated to speech data B. On the other hand, in the case of the address burst, only a part of the 8 bits is allocated to an address A and the remaining bits are allocated to control data D, as shown in FIG. 4(a) in which the start bit, the address/data select bit, and the stop bit are omitted and therefore not shown. In this embodiment, the 3 higher significant bits are allocated to an address A so as to select 7 slave main installations and the 5 remaining bits are allocated to control data D. Further, the above-mentioned address burst formation is applicable to only the down going data from the master main installation to the slave main installation. In the case of the up coming data from the slave main installation to the master main installation, since it is unnecessary to designate an address because the data is necessarily transmitted to the master main installation, the burst data is composed of only the control data D as shown by the third burst in FIG. 4(b) in which the start bits and others are omitted.

When the microprocessor 20 in the master main installation 1 outputs data to the down between-system highway 3, an address representative of a slave main installation to which the data are to be transmitted is first designated. That is, as shown in FIG. 4(a), when speech data is transmitted, first an address burst is transmitted and thereafter a speech data burst is transmitted.

Further, when only control data is transmitted, since control data is incorporated in an address burst as shown by the third burst in FIG. 4(a), only an address burst is outputted.

The microprocessor 30 of the slave main installations 2a to 2g receives a burst transmitted from the master main installation 1 and discriminates whether the received burst is an address burst or a speech data burst on the basis of the address/data select bit A/D. In the case of an address burst, the microprocessor 30 reads the 3 higher significant bits (indicative of an address A) of the data and compares the read address A with that previously registered in the installation as service or maintenance data when installed. As a result, only the slave main installation whose address coincides with the read address A receives the remaining 5 bits (indicative of control data) and further speech data B (where the succeeding burst is a speech data burst), and transmits up-coming data (the speech data B or control data D) as shown in FIG. 4(b) to the master main installation 1. On the other hand, the other slave main installations whose address does not coincide with the read address A stand by, without transmitting or receiving any bursts until the succeeding address burst is received.

Figure 5:
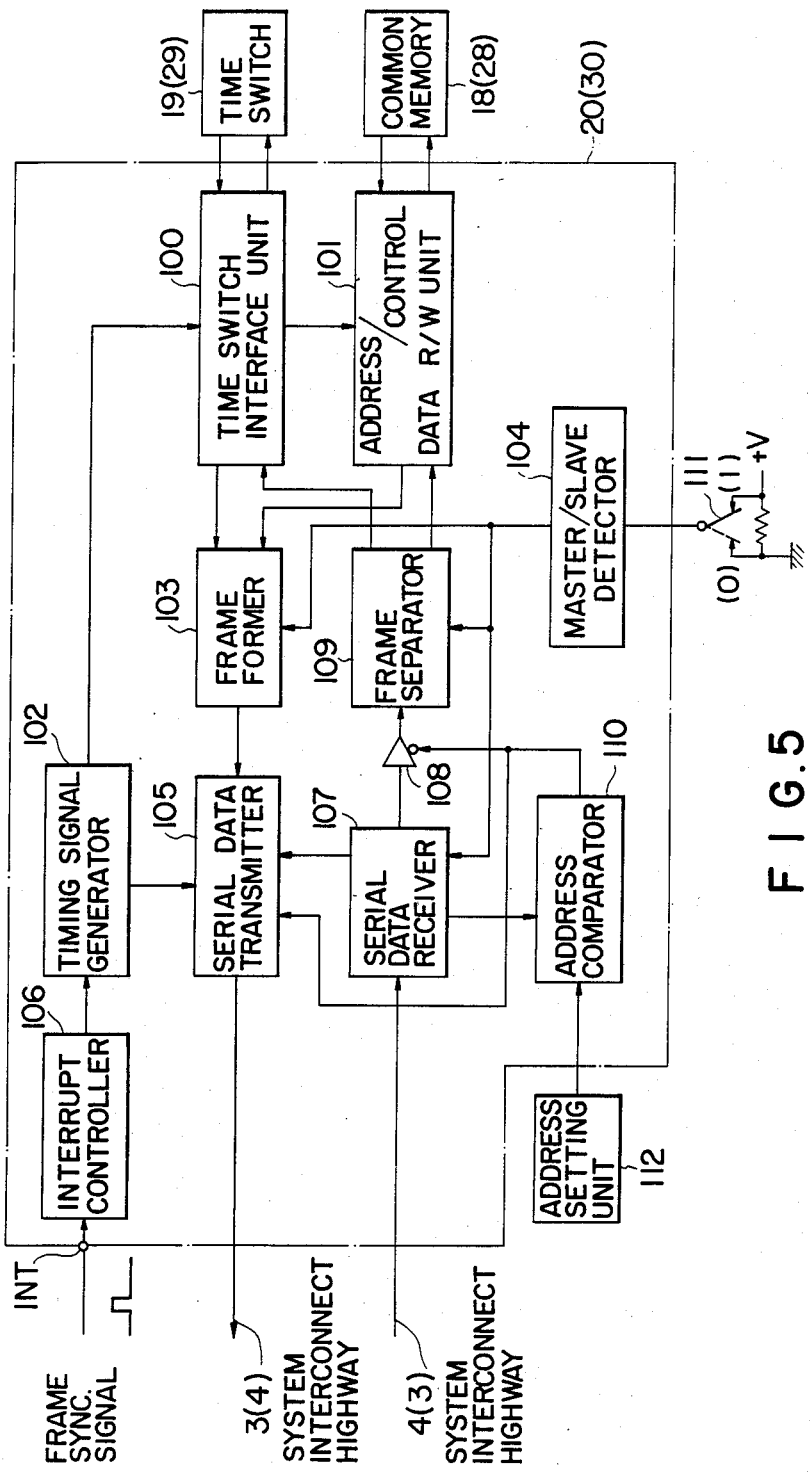
FIG. 5 is a block diagram showing a microprocessor intercorporated in an interface unit for connecting the systems in the embodiment shown in FIG. 3.

FIGS. 5 and 6 show system configurations of the microprocessor 20 (or 30) and the slave-side subprocessor 17 (or 27), respectively both incorporated in the system interconnecting interface unit 14 (or 24) in order to realize the above-mentioned between-system communication.

As shown in FIG. 5, the microprocessor 20 (or 30) comprises a time switch interface unit 100 for transmitting and receiving speech data to and from the time switch 19 (or 29) and an address·control data read/write unit 101 for transmitting and receiving address data (for only the master main installation) and control data to and from the common memory 18 (or 28). This time switch interface unit 100 receives two-channel speech data transmitted from the time switch 19 (or 29), temporarily stores these data in a buffer memory (not shown), and transmits the speech data stored in the buffer memory to a frame former 103 at an appropriate timing in response to a read/write timing signal supplied from the timing signal generator 102. The address·control data read/write unit 101 reads addresses for 3 channels (for only the master main installation) representative of the slave main installations to which data are to be transmitted and control data for 3 channels to be transmitted from the common memory 18 (or 28), temporarily stores the read data in a buffer memory (not shown), and transmits these address and control data stored in the buffer memory to the frame former 103 at an appropriate timing in response to a timing signal supplied by the time switch interface unit 100.

This frame former 103 arranges the two-channel speech data from the time switch interface unit 100 and the three-channel address and control data from the address·control data read/write unit 101 in accordance with the format shown in FIG. 4(a) or (b) to form a data group for one frame. As already explained with reference to FIG. 3, the frame format is different between data transmitted from the master main installation and data transmitted from the slave main installation. To form the data format differently, a mode setting for determining the master main installation format or the slave main installation format is made by a master/slave detection unit 104 utilizing a master/slave setting manual switch 111 when the main installation is installed.

This setting switch 111 applies a logical "1" level signal (at the position shown by a solid line in FIG. 5) and a logical "0" level signal (at the position shown by a dashed line in FIG. 5) to the master/slave detection unit 104. The master/slave detection unit 104 gives a first mode setting signal for the master main installation in response to the "1" level signal and a second mode setting signal for the slave main installation in response to the "0" level signal, both to the frame former 103 in order to enable the unit 103 to select a frame format corresponding thereto. The formed one-frame data is transmitted to a serial data transmit circuit 105 in a parallel transmission mode.

The serial data transmit circuit 105 forms a burst on the basis of the parallel-transmitted one-frame data and outputs the formed burst to the between-system highway 3 (or 4) in a serial transmission mode at a timing as shown in FIG. 7 in response to a transmit timing signal from the timing signal generator 102. In order to determine this transmit timing and the above-mentioned read timing by the timing switch interface unit 100, a frame synchronizing signal on the speech highway 11 (or 21) is inputted to an interrupt controller 106 through an interrupt terminal INT. On the basis of an output signal from this interrupt controller 106, the timing generator 102 generates a transmit timing signal and a read/write timing signal. However, in the case of the slave main installation, the above data are transmitted at a timing when a receive-end signal is given from a serial data receiver 107 to the serial data transmitter 105 and further an address match signal is given from an address comparator 110. In other words, the data transmission operation of the master main installation 1 is implemented on the basis of the frame synchronizing signal on the speech highway 11 of the master main installation 1, while the data transmission operation of the slave main installation 2 is implemented in synchronism with the transmission operation of the master main installation 1.

The serial data receiver 107 receives bursts on the between-system highway 4 (or 3) in a serial reception mode, and transmits data in the received bursts to a frame separator 109 via a normally turned-on gate circuit 108 in accordance with operation opposite to that of the above serial data transmitter 105.

Further, whenever each burst is received, the serial data receiver 107 sends a reception end signal to the serial data transmitter 105.

When the slave main installation mode is set in response to a signal from the master/slave detector 104 and the serial data receiver 107 receives an address burst, this receiver 107 transmits an address included in the received address burst to an address comparator 110. The address comparator 110 compares the received address with an address representative of its own installation previously set in an address presetting unit 112 composed of a semiconductor memory, for instance. If the received address does not match the preset address, the gate circuit 108 is turned off. If the received address matches the preset address, the received data are transmitted to the frame separator 109.

This frame separator 109 separates the received one-frame data group into speech data for two channels, addresses for three channels (only for the slave main installation) and control data in accordance with operation opposite to that of the frame former 103. The separated speech data are given to the time switch interface unit 100, and the separated address and control data are given to the address-control data read/write unit 101, respectively. The time switch interface unit 100 and the address-control data read/write unit 101 process these data in accordance with operation opposite to that of data transmission.

As shown in FIG. 6, the slave-side subprocessor 17 (or 27) is connected to the common memory 18 (or 28) on the side opposite to the microprocessor 20 (or 30), and includes a common memory write unit 200 for writing control data (which includes an address of the slave main installation to which the speech data are to be transmitted, in the case of the master main installation) and a common memory read unit 201 for reading control data from the common memory 18.

The control data written in the common memory 18 by the common memory write unit 200 are received by a serial data receiver 202 through the data highway 12 (or 22). This serial data receiver 202 transmits the received control data to a gate circuit 203 and the address received prior to the control data to an address comparator 204.

This received address is an address representative of a unit (e.g. the between-system interface unit, an exchange office interface unit, a terminal device interface unit, etc.) to which the received control data are to be transmitted. The address comparator 204 compares the received address with an address representative of a unit and previously set in an address presetting unit 211 composed of a semiconductor memory, for instance. If the received address matches the preset address, a gate circuit 203 is turned on to permit the received control data to be written in a data receive buffer 205. The control data written in the receive buffer 205 are read by a common memory write unit 200 and are then written in the common memory 18 (or 28).

The control data read from the common memory 18 (or 28) by a common memory read unit 201 are temporarily stored in a data transmit buffer 206. The serial data receiver 202 transmits an up data request bit attached to the end of the received address to an up date request bit detector 208. This up data request bit detector 208 turns on a gate circuit 209 when the up data request bit is at a predetermined logic level (e.g. "1"). Once the gate circuit 209 is kept turned on, a serial data transmitter 210 reads control data from the data transmit buffer 206 and transmits the control data together with an attached address representative of the master-side subprocessor 16 (or 26) to the data highway 12 (or 22) in a serial transmission mode.

The operation of the digital key telephone system according to the present invention configured as described above will be described hereinbelow by taking the case where an extension to-extension call is implemented between a terminal device connected to an extension line of the master main installation and a terminal device connected to an extension line of the slave main installation.

FIG. 7 is a speech data sequence chart of the above example, which indicates a way of speech data transmission between the two main installations. However, description of the procedure in which speech data from the terminal device are transmitted within the main installation from the up speech highway, through the time switch, to the down speech highway is not fully described herein because this procedure is well known.

A speech data $B_1$ (for one time slot) on the speech highway (down) in the master main installation 1 is read from the data bus by the time switch 19 and received by the microprocessor 20. The speech data are read by the microprocessor 20 when the microprocessor 20 designates a highway number and a time slot address to the time switch 19. This reading time is determined by inputting a frame synchronizing signal on the speech highway 11 to the interrupt terminal INT of the microprocessor 20, as already described. That is, the microprocessor 20 reads speech data from the speech highway 11 whenever this frame synchronizing signal is inputted. Once a speech data $B_1$ is read as described above, the microprocessor 20 transmits an address burst indicative of a transmit destination and then the burst of the speech data $B_1$ to the down between-system highway 3.

Since the slave main installation (e.g. 2a) to which the data are to be transmitted is operating on the basis of frame synchronizing timing different from that of the master main installation 1, upon reception of the speech data $B_1$, the microprocessor 30 transmits the speech data $B_1$ to a determined time slot on the speech highway 21 via the time switch 29 in synchronism with the interrupt signal from the speech highway 21. As described above, the speech data $B_1$ transmitted on the speech highway 21 is exchanged by the time switch 23 and then transmitted to a designated terminal device.

On the other hand, with respect to the control data, when a specific number for selecting the slave master installation 2a is inputted from a terminal connected to the master main installation 1 and then an extension selecting number in the slave main installation 2a is inputted, the central processing unit 15 in the master main installation 1 decodes this number and transmits control data D indicative of signal reception from the master-side subprocessor 16 to the slave-side subprocessor 17 via the data highway 12. This control data D is written in the common memory 18. The microprocessor 20 reads this data from the common memory 18, inserts an address indicative of the selected slave main installation 2a into the 3 higher significant bits of 8-bit data and the control data D into the 5 remaining bits, and transmits this 8-bit data to the down between-system highway 3.

The microprocessor 30 of the slave main installation 2a receives the control data D including an address representative of its own installation and writes this data D in the common memory 28. This data is read by the slave-side subprocessor 27, transmitted to the central processing unit 25 via the data highway 22 and the master-side subprocessor 26, and decoded by the central processing unit 25 to implement a terminating operation to the selected terminal device.

On the other hand, the transmission procedure of speech data and the control data from the slave main installation to the master main installation is almost the same as the above procedure. However, the data transmission operation from the slave main installation to the master main installation is performed in response to only data transmitted from the master main installation to the slave main installation.

In the above embodiment, the master main installation designates a slave main installation separately. However, the master main installation can designate a plurality of slave main installations simultaneously. FIG. 8 shows a data format on the between-system highway, by which it is possible to designate each slave main installation separately, a plurality of slave main installations belonging to three groups of different kinds simultaneously, and all slave main installations simultaneously.

In this embodiment, the data transmission between the two systems is of a synchronous transmission method such that data are transmitted in an 11-bit burst unit; the frame interval is 125 μsec the same as the one frame required when speech data are transmitted within the main installation in a time division multiplexing method at a transmission speed of 64 Kb/s (=8 KHz ×8 bits), which is the same as in the preceding embodiment. Different from the preceding embodiment, however, three channels, one for address designation, one for control data and one for speech data, are provided.

Each burst is composed of 11 bits in total including a start bit (1 bit), data bits (8 bits), an address/data select bit (1 bit) and a stop bit (1 bit). In FIG. 8, bits other than data are omitted for clarity. An address/data select bit discriminates whether the burst transmits data, control data or speech data (referred to as a data burst, hereinafter) or an address for selecting a slave main installation (referred to as an address burst, hereinafter).

In the case of a data burst, 8 bits of a data in the burst are all allocated to control data or speech data.

On the other hand, in the case of an address burst, as shown in FIG. 8(c), 8 bits are divided into three segments of an all/separate address segment (one head bit), a group/separate address segment (two succeeding bits), and a separate address segment (five remaining bits). When the all/separate address segment is "1", this indicates the same information communication to all the slave main installations. When the all/separate address segment is "0", this indicates group communication or separate communication. When the group/separate address segment is "01", "10" or "11", respectively, this indicates the same information communication (referred to as group communication, hereinafter)to a plurality of slave main installations belonging to three groups previously registered so as to correspond to each code. When the group/separate address segment is "00" this indicates separate communication. Therefore, when the all/separate address segment is "0" and simultaneously when the group/separate address segment is "00", this indicates separate communication. The separate address segment indicates each separate address representative of each slave main installation.

When the microprocessor 20 in the master main installation 1 outputs data to the down between-system highway 3, as shown in FIG. 8(a) data is outputted in the order of an address burst, a control data burst and a speech data burst within one frame.

When the microprocessors 30 of all the slave main installations 2a to 2g receive the above address burst, the microprocessors 30 first discriminate whether the all/separate address segment is "1". If "1", that is, in the case of the same information communication to all the slave main installations, all the slave main installations 2a to 2g permit the succeeding data bursts to be received to receive control data and speech data. Further, in the case of up data transmission, the microprocessor 30 checks the separate address segment of the address burst, and only the slave main installation whose address (previously registered) matches the checked address transmits up data as shown in FIG. 8(b).

On the other hand, when the all/separate address segment of the received address burst is "0", the microprocessors 30 of the slave main installations 2a to 2g check the group/separate address segment. If the checked group/separate address segment is "10", for instance, only the plural slave main installations belonging to a group previously determined by this code permit the succeeding data burst to be received, and the other slave main installations not belonging to the group prohibit the succeeding data burst from being received and stand-by during the reception of the succeeding address burst. Here, standby operation implies that the installation does not receive or transmit data. Further, in the same way, only the slave main installations designated by the separate address segment transmit up data to the master main installation.

Further, where the all/separate address segment and the group/separate address segment are "000", that is, where separate communication is designated, the microprocessors 30 of the slave main installations 2a to 2g read the separate address segment of the address burst to check whether the read address matches that of its own installation. As a result, only the slave main installation whose address matches the read address permits the succeeding data bursts to be received and transmits up data. The other slave main installations all stand by during the succeeding address burst.

To implement the above-mentioned communication between the two systems, the microprocessor 20 (or 30) and the slave-side subprocessor 17 (or 27) in the system interconnecting interface unit 14 (or 24) are configured as shown in FIGS. 5 and 6, basically. However, each unit can be modified so as to be applicable to the data format shown in FIG. 8.

As described above, when the same information communication to all the slave main installations, the group communication, and the separate communication can be freely selected on the basis of address designation from the master main installation 1, it is also possible to simultaneously call any given plural slave main installations on the basis of a single transmit operation from the master main installation. Therefore, it is possible to provide the advantage that the same information communication to plural slave main installations is effective. Additionally, the processing load of the master main installation is reduced.

Embodiments of the digital key telephone system according to the present invention have been described by way of examples. However, this invention is not of course limited to the above specific embodiments thereof.

What is claimed is:

1. A digital key telephone system having a master main installation and at least two slave main installations, said master main installation comprising:
   (a) first speech data exchange means for exchanging digital speech data in first time division channels;
   (b) first data transmit/receive means, connected to first terminal devices of said master main installation, for transmitting and receiving digital speech data to and from said first time division channels based on communication with said first terminal devices;
   (c) first control means for generating digital control data to control said first speech data exchange means, said first data transmit/receive means and said slave main installations; and
   (d) first digital interface means for transmitting digital control data from said first control means and digital speech data from said first time division channels to said slave main installations whose addresses are designated by said master main installation; and each of said slave main installations comprising,
(a) second speech data exchange means for exchanging digital speech data in second time division channels;
(b) second data transmit/receive means, connected to second terminal devices of said slave main installation, for transmitting and receiving digital speech data to and from said second time division channels based on communication with said second terminal devices;
(c) second control means for generating digital control data to control said second speech data exchange means and said second data transmit/receive means; and
(d) second digital interface means for receiving digital control data and digital speech data transmitted from said master main installation only when an address of said slave main installation is designated by said master main installation, and for transmitting received digital control data and received digital speech data to said second control means and to said second time division channels, respectively.

2. A digital key telephone system of claim 1, wherein said master main installation designates addresses of said slave main installations simultaneously or separately, said second digital interface means receiving digital control data and digital speech data transmitted from said master main installation only when addresses are designated simultaneously or separately.

3. A digital key telephone system of claim 2, wherein said master main installation transmits to a slave main installation address designation data whose format includes a first address segment for designating slave main installations simultaneously and a second address segment for designating each of said slave main installations separately.

4. A digital key telephone system of claim 1, wherein said master main installation designates addresses of all of said slave main installations simultaneously, addresses of a subset of said slave main installations simultaneously, and an address of each of said slave main installations separately, said second digital interface means receiving digital control data and digital speech data transmitted from said master main installation only when at least one address is designated simultaneously or separately.

5. A digital key telephone system of claim 4, wherein said master main installation transmits to said slave main installations address designation data whose format includes a first address segment for designating all of said slave main installations simultaneously, a second address segment for designating a subset of said slave main installations simultaneously and a third address segment for designating each of said slave main installations separately.

6. A digital key telephone system of claim 1, wherein said second digital interface means transmits data to said master main installation only when a slave main installation receives data transmitted from said master main installation.

7. A digital key telephone system of claim 1, wherein digital control data and digital speech data are transmitted between said master main installation and said slave main installations in a duplex serial transmission manner.

8. A digital key telephone system of claim 7, wherein digital control data and digital speech data are transmitted between said master main installation and said slave main installations by transmitting a burst which includes a start bit, data bits, an address/data select bit, and a stop bit.

9. A digital key telephone system of claim 8, wherein representative address information representative of each of said slave main installations is transmitted in a burst which includes digital control data; said first digital interface means first transmits a burst which includes said representative address information and then a burst which includes digital speech data to said slave main installations; and second digital interface means of each of said slave main installations receives digital control data included in a current burst and digital speech data included in a succeeding burst only when an address representative of its own installation is included in said current burst transmitted from said master main installation.

10. A digital key telephone system of claim 8, wherein representative address information representative of each of said slave main installations is transmitted in an address burst which includes only representative information said address as data; said first digital interface means transmits said address burst and then succeeding bursts which include digital speech data and digital control data; and second digital interface means of each of said slave main installations receives digital speech data and digital control data included in said succeeding bursts only when an address representative of its own installation is included in said address burst transmitted from said master main installation.

* * * * *